INVENTORS:
KURT HACKER
ERWIN KOHL
REINHOLD WEIGELE
BY
their ATTORNEY

United States Patent Office 3,461,473
Patented Aug. 19, 1969

3,461,473
METHOD FOR TREATING ARTICLES OF LEATHER
Kurt Hacker, Stuttgart-Zuffenhausen, Erwin Koehl, Stuttgart-Weilimdorf, and Reinhold Weigele, Korntal, Germany, assignors to Fortuna-Werke Maschinenfabrik Aktiengesellschaft, Stuttgart-Bad Cannstatt, Germany
Filed May 31, 1967, Ser. No. 642,360
Claims priority, application Germany, June 7, 1966,
F 30,294, F 49,409
Int. Cl. A43d; B30b 15/02
U.S. Cl. 12—146            5 Claims

ABSTRACT OF THE DISCLOSURE

A rotary indexible carrier in a shoe making machine has a supporting surface composed of a succession of $n$ plus 2 zones which can support groups of bondable blanks made of leather or the like. A heating member is movable up and down above the carrier and has a countersurface composed of $n$ areas each of which registers with a zone when the carrier is idle. Blanks are treated in $n$ stages while they register with successive areas of the countersurface. Two or more zones of the supporting surface are exposed at all times to facilitate removal of finished blank groups and loading of the carrier with fresh blanks.

BACKGROUND OF THE INVENTION

The present invention relates to a method and apparatus for joining, ironing or otherwise treating groups of articles by the application of heat and/or pressure, particularly for welding together portions of articles of footwear. Such articles may consist of textile, synthetic plastic, leather or a combination of such materials.

In presently known shoe making machines which are utilized for welding, ironing, deforming and/or other treatment of precut blanks of leather or the like, the operator places a first blank onto the supporting surface of a carrier and thereupon applies over the first blank one or more second blanks which are coated with a layer of adhesive and must be located in a predetermined position with reference to the first blank and with reference to each other. For example, the first blank may constitute the vamp and a second blank may constitute the cap of a shoe upper. In the next step, the carrier is placed into registry with a heating member and the latter is moved toward the carrier to protect the blanks to the action of heat and pressure. The heating action is maintained for a certain period of time whose length depends on the nature of adhesive. In the final step, the heating member is moved away from the carrier and the latter is moved away from register with the heating member so that the welded-together blanks can be removed from the carrier and the latter is ready to receive fresh blanks.

A serious drawback of such conventional methods and apparatus is that the periods of dwell of the heating member in heating position are normally much longer than the intervals required for removing joined blanks from and for placing fresh blanks onto the carrier. Thus, the operator is occupied only during a relatively short stage of a complete cycle and the output of such apparatus is rather low. Attempts to increase the output include the servicing of two apparatus by a single person; however, this merely increases the output of the operator but not the output of individual apparatus and necessitates additional floor space and excessive expenditures for additional machinery and maintenance. Furthermore, servicing of two apparatus by a single operator is tiresome because the operator must change his or her position during each period when one of the apparatus subjects a group of blanks to the action of heat and/or pressure.

SUMMARY OF THE INVENTION

An object of our invention is to provide a novel method and apparatus for economical bonding or other treatment of individual or grouped leather blanks or analogous articles by resorting to relatively simple machinery and by full utilization of each workman, not only prior to but also during the application of heat and/or pressure.

Another object of the invention is to provide a multistage method of joining groups of heat-sealable articles.

A further object of the invention is to provide a heat-sealing or ironing apparatus for leather blanks or the like whose output is a multiple of the output of presently known apparatus.

An additional object of the invention is to provide an apparatus which can be operated automatically or semi-automatically and which can be manipulated by persons having little technical skill.

A concomitant object of the invention is to provide an apparatus which can joint flat, curved or otherwise configurated blanks of leather, plastic, textile or the like.

One feature of the present invention resides in the provision of a multi-stage method of treating individual articles or groups of articles by the application of heat and/or pressure, particularly of joining groups of blanks which form part of articles of footwear. The method comprises the steps of placing articles to be treated onto successive zones of a supporting surface, intermittently advancing such zones into registry with successive ones of at least two areas of a heating surface or countersurface so that each area of the countersurface registers with one of the zones during intervals between intermittent advances of the supporting surface, moving at least one of the two surfaces toward the other surface during each interval to subject the articles between the areas of the countersurface and the registering zones of the supporting surface to the action of heat and/or pressure, and maintaining the one surface close to the other surface for a predetermined period of time.

If the heating and/or compression of articles requires a total time T and the number of areas on the countersurface is $n$, the duration of the aforementioned periods is preferably $T/n$. The number of areas on the countersurface preferably equals the number of zones on the supporting surface minus two so that two zones of the supporting surface are out of registry with the countersurface. Fresh articles or groups of articles can be placed onto one of the exposed zones and bonded or otherwise treated groups of articles can be removed from the other exposed zone.

In accordance with a presently preferred embodiment of our invention, the zones of the supporting surface form an annulus and the supporting surface is rotated about an axis which passes through the center of such annulus. The countersurface is preferably located above the supporting surface and is movable up and down during such intervals when the supporting surface is at a standstill.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
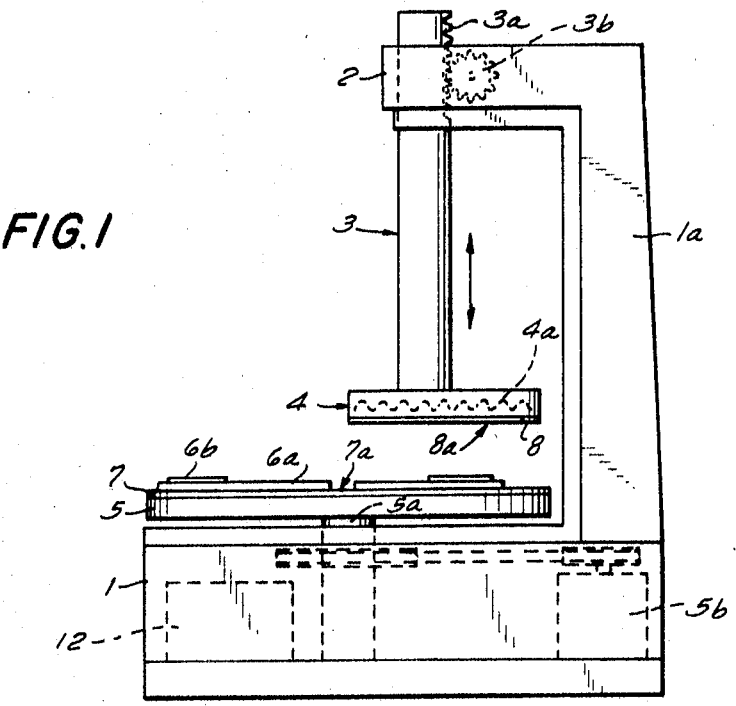
FIG. 1 is a somewhat schematic side elevational view of an apparatus which embodies the present invention.

The drawing illustrates an apparatus which comprises a frame including a base 1, an upright or column 1a and an overhanging arm 2. The latter supports a vertically movable ram 3 carrying at its lower end a plate-like heating member 4 of substantially semicircular outline. The underside of the heating member 4 is provided with a liner 8 of heat-resistant elastomeric plastic material having an exposed semicircular countersurface or heating surface 8a composed of two segment-shaped areas or portions 8A, 8B. The operating means for moving the heating element 4 up and down may be of any known design; in the illustrated embodiment, such operating means comprises a vertical rack 3a affixed to or provided on the ram 3 and meshing with a pinion 3b in or on the arm 2. It is also possible to form the ram 3 with external threads and to provide in the arm 2 a rotary nut which meshes with the ram and can be rotated by a suitable motor or another prime mover.

The base 1 supports a plate-like carrier or platform 5 which is of circular outline and is provided with a liner 7 of heat-resistant elastomeric material having a supporting surface 7a which is subdivided into an annulus of four segment-shaped zones or portions A, B, C and D. The carrier 5 has a shaft 5a which is journalled in the base 1 and is connected with a suitable indexing mechanism or second operating means schematically shown at 5b and serving to turn the carrier 5 at regular or irregular intervals through angles of 90 degrees so as to place successive zones A, B, C, D into registry first with the area 8A and thereupon wtih the area 8B.

Figure 2:
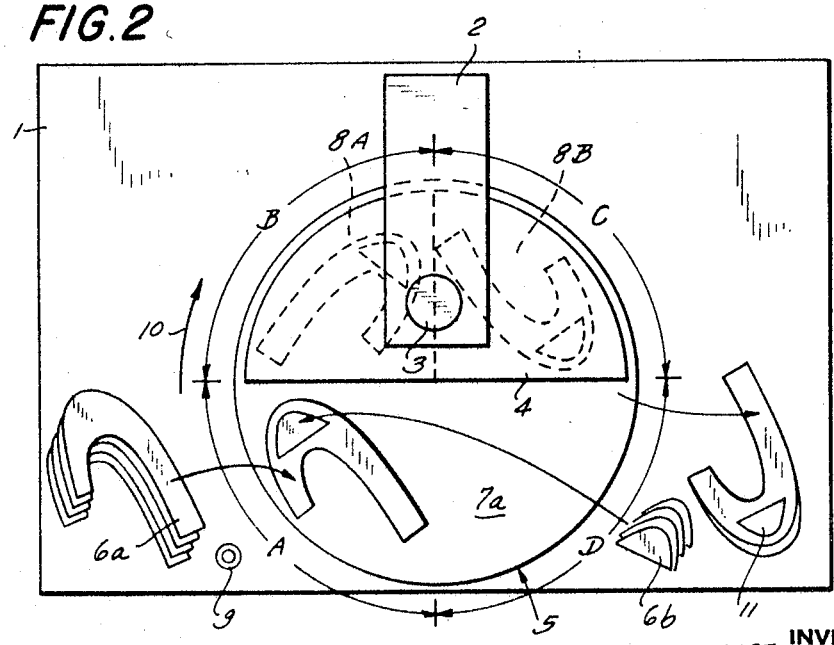
FIG. 2 is a schematic top plan view of the apparatus.

For the sake of simplicity, the carrier 5 of the apparatus shown in FIGS. 1 and 2 comprises a supporting surface 7a with only four zones A–D. Therefore, the heating surface 8a of the heating member 4 is provided with two areas 8A, 8B, two less than the total number of zones. However, it is equally within the purview of our invention to use a carrier with say five, six or more zones on its supporting surface in combination with a heating member having three, four or more areas on its heating surface. The member 4 accommodates one or more heating elements 4a to maintain the surface 8a at a desired temperature.

It is clear that the carrier 5 may be constituted by an endless conveyor and that the groups of articles on the supporting surface of such conveyor can travel in a straight path, at least during movement into and away from registry with the area of the heating member. For example, the carrier may be constituted by an apron conveyor whose upper stringer travels below the heating member. However, the apparatus of FIGS. 1 and 2 has been found to be especially suited for our purposes because the loading and evacuating stations (zones A and D in FIG. 2) are directly in front of the operator.

The operation is as follows:

The person in charge who stands or sits in front of the apparatus (below the base 1, as viewed in FIG. 2), places a first blank 6a onto the area A of the supporting surface 7a while the carrier 5 dwells in the angular position shown in FIG. 2. The operator also places a second blank 6b onto the blank 6a before the indexing mechanism 5b causes the carrier 5 to turn through 90 degrees (arrow 10). During placing of a fresh group of blanks 6a, 6b onto the zone A, the member 4 is held in the lower end position and applies heat and/or pressure to the blanks which were placed onto the areas B, C in the preceding operations. The heating member 4 is then moved back to the raised position shown in FIG. 1 and the indexing mechanism 5b advances the carrier 5 through 90 degrees so that the zone A registers with the area 8A and that the zone B registers with the area 8B. At the same time, the zone C becomes exposed and the finished product 11 consisting of welded-together articles or blanks 6a, 6b can be swept off the zone D before the latter moves to the position occupied in FIG. 2 by the zone A.

In the next stop, the heating member 4 descends again in response to rotation of the pinion 3b so that the areas 8A, 8B respectively bear against the groups of blanks on the zones B and C while the operator places fresh blanks 6a, 6b onto the zone A. The same operation is repeated again and again, and it will be seen that the operator is busy at all times, i.e., also at such times when the cooperating surfaces 7a, 8a actually perform a welding, bonding, ironing or other action.

In the illustrated embodiment, the total time T required for bonding of a blank 6a to a blank 6b is sub-divided into $n$ periods $t$ wherein $n$ is the number of areas on the surface 8a. The intermittent angular movements of the carrier 5 equal 90 degrees, i.e., 360 degrees divided by $n+2$.

The elastomeric liner 8 and/or 7 may be omitted, i.e., the heating and supporting surfaces may be constituted by the exposed faces of the heating member 4 and carrier 5. It is desirable to provide the heating surface 8a on a material which does not tend to adhere to the blanks 6a and/or 6b so that the finished products 11 will remain on the supporting surface 7a when the heating member 4 is moved to the raised position of FIG. 1. Also, the surfaces 7a, 8a may but need not be flat, depending on the desired configuration of finished products 11. Thus, it is clear that each zone of the supporting surface 7a may be formed with depressions or protuberances and that the areas 8A, 8B are then formed with matching protuberances or depressions to insure that the members 4, 5 act not unlike two dies and effect welding as well as simultaneous ironing, bending, arching or other deformation of products 11.

The base 1 carries a starter member in the form of a pushbutton 9 which will be depressed by the operator or which can be actuated automatically to index the carrier 5 at desired intervals. The base 1 may further accommodate or carry a suitable control unit or programing unit (indicated by a box 12) which can control the sequence of operations by intermittently indexing the carrier 5, moving the heating member 4 up and down when the carrier 5 is idle, and maintaining the heating member 4 in lower end position for a predetermined period of time so that the total of $n$ periods $t$ equals T. The arrangement is preferably such that the extent of indexing movements of the carrier 5 and the periods of dwell of the heating member 4 in lower and/or upper end position may be varied by appropriate adjustments of the programming unit 12. Also, the length of intervals $t_A$ between successive indexing movements of the carrier 5 may be selected at will so that the length of an interval $t_A$ can equal or exceeds a period $t$. Depression of the push button 9 can start one or more automatic cycles.

The dimensions of each area and each zone will be selected with a view to accommodate the largest blanks which are to be treated in our apparatus. The liners 7, 8 compensate for differences in thickness of groups of blanks which are placed onto the zones A–D.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims:

1. A method of joining blanks, particularly blanks forming part of articles of footwear, in which the blanks have to be subjected during a total treating time T to the application of heat and pressure in order to be permanently joined, said method comprising the steps of superimposing the blanks to be joined onto successive zones of a supporting surface; intermittently advancing said zones of the supporting surface into registry with a plurality of areas of a counter surface so that each area of the countersurface registers with one of said zones during intervals between intermittent advances of said surface; and moving at least one of said surfaces toward the other surface during said intervals to subject said superimposed blanks between said areas and the registering zones of said supporting surface to the action of heat and pressure for a predetermined time equal to the total treating time T divided by the number of said areas, and sufficient for an operator to remove joint blanks from one of said zones and to superimpose blanks onto an adjacent zone of said supporting surface during said intervals of advancing said zones, whereby the time of producing a unit of joined blanks may be reduced from the total treating time T to said predetermined period of time.

2. A method as defined in claim 1, wherein the number of said areas equals the number of said zones minus two.

3. A method as defined in claim 1, wherein said zones form an annulus and wherein said supporting surface is turnable about an axis which passes through the center of said annulus.

4. A method as defined in claim 3, wherein said one surface is said countersurface and wherein said countersurface is disposed at a level above said supporting surface.

5. A method as defined in claim 1, further comprising the step of heating one of said surfaces.

References Cited

UNITED STATES PATENTS

| | | | |
|---|---|---|---|
| 1,855,221 | 4/1932 | Burkholder et al. | 100—223 X |
| 2,498,541 | 2/1950 | Galper | 100—223 |
| 3,256,420 | 6/1966 | Werman | 12—1 |
| 2,006,071 | 6/1935 | Edwards | 12—52 |
| 2,049,175 | 7/1936 | Regan | 12—146 |
| 2,134,723 | 11/1938 | Marshall | 12—52 |
| 3,329,983 | 7/1967 | Clamp | 12—146 |

PATRICK D. LAWSON, Primary Examiner

U.S. Cl. X.R.

100—223